(12) United States Patent
Marcantonio

(10) Patent No.: US 7,736,607 B2
(45) Date of Patent: *Jun. 15, 2010

(54) PROCESS FOR METALS RECOVERY FROM SPENT CATALYST

(75) Inventor: Paul J. Marcantonio, San Rafael, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/345,798

(22) Filed: Dec. 30, 2008

(65) Prior Publication Data

US 2009/0110620 A1    Apr. 30, 2009

Related U.S. Application Data

(63) Continuation of application No. 11/192,522, filed on Jul. 29, 2005, now Pat. No. 7,485,267.

(51) Int. Cl.
*C22B 7/00* (2006.01)

(52) U.S. Cl. .............................. 423/54; 423/55; 423/56; 423/67; 423/68; 423/87; 423/139; 423/146; 423/306

(58) Field of Classification Search .............. 423/54–56, 423/67, 68, 87, 139, 146, 306
See application file for complete search history.

(56) References Cited

U.S. PATENT DOCUMENTS

| | | | |
|---|---|---|---|
| 3,357,821 A | 12/1967 | Henrickson | |
| 3,455,677 A | 7/1969 | Litz | |
| 3,763,303 A | 10/1973 | Khuri et al. | |
| 3,903,241 A | 9/1975 | Stevens et al. | |
| 4,131,455 A | 12/1978 | Edwards et al. | |
| 4,145,397 A | 3/1979 | Toida et al. | |
| 4,216,118 A | 8/1980 | Yoshida et al. | |
| 4,220,634 A | 9/1980 | Deschamps et al. | |
| 4,298,581 A | 11/1981 | Douglas et al. | |
| 4,374,100 A | 2/1983 | Sebenik et al. | |
| 4,409,190 A | 10/1983 | Van Leirsburg | |
| 4,417,972 A | 11/1983 | Francis et al. | |
| 4,432,949 A | 2/1984 | Hubred et al. | |
| 4,432,953 A | 2/1984 | Hubred et al. | |
| 4,434,043 A | 2/1984 | Singhal et al. | |
| 4,500,495 A | 2/1985 | Hubred et al. | |
| 4,514,369 A | 4/1985 | Hubred et al. | |
| 4,541,868 A | 9/1985 | Lowenhaupt et al. | |
| 4,544,533 A | 10/1985 | Marcantonio | |
| 4,548,700 A | 10/1985 | Bearden, Jr. et al. | |
| 4,554,138 A | 11/1985 | Marcantonio | |
| 4,661,265 A | 4/1987 | Olson et al. | |
| 4,762,812 A | 8/1988 | Lopez et al. | |
| 4,832,925 A | 5/1989 | Weir et al. | |
| 4,861,565 A | 8/1989 | Sefton et al. | |
| 4,900,522 A | 2/1990 | Chou et al. | |
| 5,099,047 A | 3/1992 | Sato et al. | |
| 5,246,570 A | 9/1993 | Cronauer et al. | |
| 5,415,849 A | 5/1995 | Toyabe et al. | |
| 5,457,258 A | 10/1995 | Hommeltoft et al. | |
| 5,505,857 A | 4/1996 | Misra et al. | |
| 5,573,556 A | 11/1996 | Wen | |
| 6,153,155 A | 11/2000 | Wen et al. | |
| 6,180,072 B1 | 1/2001 | Veal et al. | |
| 6,589,492 B2 | 7/2003 | Matsumoto et al. | |
| 6,673,732 B2 | 1/2004 | Muhler et al. | |
| 6,733,564 B1 | 5/2004 | Sahu et al. | |
| 7,033,480 B2 | 4/2006 | King | |
| 7,067,090 B2 | 6/2006 | Han et al. | |
| 7,182,926 B2 | 2/2007 | Akahoshi | |
| 7,255,795 B2 | 8/2007 | Panariti et al. | |
| 7,485,267 B2 * | 2/2009 | Marcantonio | 423/54 |
| 2003/0130118 A1 | 7/2003 | Koyama et al. | |
| 2004/0219082 A1 | 11/2004 | Matjie et al. | |
| 2004/0237720 A1 | 12/2004 | Moyes et al. | |
| 2004/0241066 A1 | 12/2004 | Jasra et al. | |
| 2005/0118081 A1 | 6/2005 | Harris et al. | |
| 2005/0249652 A1 | 11/2005 | Scharifker et al. | |
| 2006/0051875 A1 | 3/2006 | Reppy et al. | |
| 2006/0135631 A1 | 6/2006 | Kopponen et al. | |
| 2006/0151399 A1 | 7/2006 | Brandts et al. | |
| 2006/0258531 A1 | 11/2006 | Koyama et al. | |
| 2007/0025899 A1 | 2/2007 | Marcantonio | |
| 2007/0098609 A1 | 5/2007 | McConnell | |
| 2007/0144944 A1 | 6/2007 | Del Bianco et al. | |

FOREIGN PATENT DOCUMENTS

JP         6228666 A2    8/1994

* cited by examiner

Primary Examiner—Steven Bos

(57) ABSTRACT

The process of this invention is directed to the removal of metals from an unsupported spent catalyst. The catalyst is subjected to leaching reactions. Vanadium is removed as a precipitate, while a solution comprising molybdenum and nickel is subjected to further extraction steps for the removal of these metals. Molybdenum may alternately be removed through precipitation.

20 Claims, 3 Drawing Sheets

PROCESS FOR METALS RECOVERY FROM SPENT CATALYST

RELATED APPLICATIONS

This application claims priority to U.S. patent application Ser. No. 11/192,522 filed Jul. 29, 2005. This application claims priority to and benefits from the foregoing, the disclosure of which is incorporated herein by reference.

FIELD OF THE INVENTION

This invention is directed to a process for recovering metals from spent, unsupported catalyst.

BACKGROUND OF THE INVENTION

Catalysts have been used widely in the refining and chemical processing industries for many years. Hydroprocessing catalysts, including hydrotreating and hydrocracking catalysts, are now widely employed in facilities worldwide. These hydroprocessing catalysts typically produce increased yields, faster reaction times, and improved product properties when compared with prior (non-catalytic thermal) processes for converting crude oils into refined products.

Hydroprocessing catalysts typically employed in commercial application today are classified as "supported" catalysts. These catalyst supports, which are generally molecular sieves such as SAPO's or zeolites, are often composed of materials such as silica, alumina, zirconia, clay, or some hybrid of these. A more expensive material, which imparts much of the actual catalytic activity, is impregnated on the support. These catalytic materials typically include metals such as nickel, molybdenum, and cobalt. In some cases platinum, palladium, and tungsten may be used.

Recently, a new generation of hydroprocessing catalysts has emerged. These catalysts do not require a support material. The catalyst is instead comprised of unsupported, micron-sized catalyst particles, such as molybdenum sulfide or nickel sulfide. These catalysts, due to factors such as increased surface area and other factors not discussed here, are many times more active than traditional supported catalysts. Performance is greatly improved during conversion operations when compared to traditional supported catalysts. One area in which these highly active, unsupported catalysts are currently being employed is vacuum residuum hydrocracking. In the process of being utilized in residue hydrocracking service, these unsupported catalysts often suffer a high amount of metals (specifically vanadium) and coke deposition, which increases the need for fresh makeup catalyst.

One drawback to both supported and unsupported catalysts is their cost. Typically, replacement costs for an expensive noble metal catalyst may be a major operating expenditure item in a refinery or chemical plant. A market has thus emerged to reclaim spent catalysts, and specifically spent hydroprocessing catalysts, so that the valuable metals can be recycled. The current high price of various metals has driven this need even further. Several spent catalyst reclaimers are currently in business at various locations around the world. Unfortunately, however, these roasting (or pyrometallurgical) based reclaimers are designed to recover metals from supported catalysts.

Due to the high concentrations of metals, specifically molybdenum and nickel, used in this new generation of unsupported catalysts, a need has been identified for an economical unsupported catalyst metals recovery process. We have developed a novel process to recover these metals from this class of highly active, unsupported, catalysts, which are composed primarily of $MoS_2$ or NiS. This process allows recovery of both the catalyst metals, including molybdenum and nickel, as well as the deposited metals, such as vanadium.

Means for recovery of vanadium, nickel and molybdenum from catalysts has been disclosed in other patents. For example, U.S. Pat. No. 4,762,812 discloses a process for the recovery of a spent supported catalyst comprising molybdenum sulfide from a hydroprocess for the upgrading of a hydrocarbonaceous mineral oil containing nickel and vanadium. The catalyst is further treated to remove molybdenum. The process preferentially recovers molybdenum, while leaving much of the vanadium in the catalyst.

U.S. Pat. No. 4,544,533 discloses a method for recovering metals from spent supported hydroprocessing catalyst. Metals recovered may be those obtained from crude oils, including iron, nickel, vanadium and tungsten as well as catalytic metals such as molybdenum, cobalt, or nickel. The catalyst is roasted to remove carbonaceous and sulfurous residues then metals are leached simultaneously from spent catalyst.

U.S. Pat. No. 4,514,369 discloses leaching spent supported catalysts, to obtain a liquor containing cobalt, nickel, molybdenum and vanadium. The metals are extracted, isolated and purified by liquid/liquid extraction techniques.

U.S. Pat. No. 4,432,949 discloses leaching metals from a catalytic support which had been previously roasted. Vanadium is removed by precipitation, and nickel, cobalt and molybdenum are then removed by serial ion exchange.

SUMMARY OF THE INVENTION

A method for recovering vanadium, nickel and molybdenum from a spent, unsupported catalyst that has been used in a hydroprocessing process, said catalyst having been slurried with fluid comprising water, said method comprising:

a) treating said spent slurried catalyst with an aqueous solvent and an oxidizer in a leaching zone at leaching conditions;

b) passing the effluent of step (a), which comprises liquid and solid material to a filtration zone, from which solid material is recovered as a filter cake;

c) passing the filter cake of step (b), which comprises ammonium metavanadate to a dissolution zone, to which ammonia is added under dissolution conditions:

d) passing the effluent of step (c) to a first filtration zone for removal of coke contaminants;

e) passing the effluent of step (d) to a crystallization zone, wherein the effluent is adjusted for pH and ammonium metavanadate crystallizes as a solid;

f) passing the effluent of step (e) to a second filtration zone for the removal of ammonium metavanadate solid;

g) drying the ammonium metavanadate solid;

h) calcining the dried ammonium metavanadate solid to produce vanadium pentoxide, which is removed as product;

i) passing the liquid material of step (b), which comprises an aqueous phase and an organic phase, to a mixer-settler zone;

j) separating the aqueous phase of step (i), which comprises molybdenum, from the organic phase, which comprises nickel;

k) subjecting the organic phase of step (k), which remains in the mixer-settler zone, to at least one cycle of extraction, scrubbing and stripping prior to the removal of nickel sulfate solution as product;

l) removing molybdenum compounds from the aqueous phase of step (j) by solvent extraction or precipitation.

DETAILED DESCRIPTION OF THE INVENTION

Figure 1:
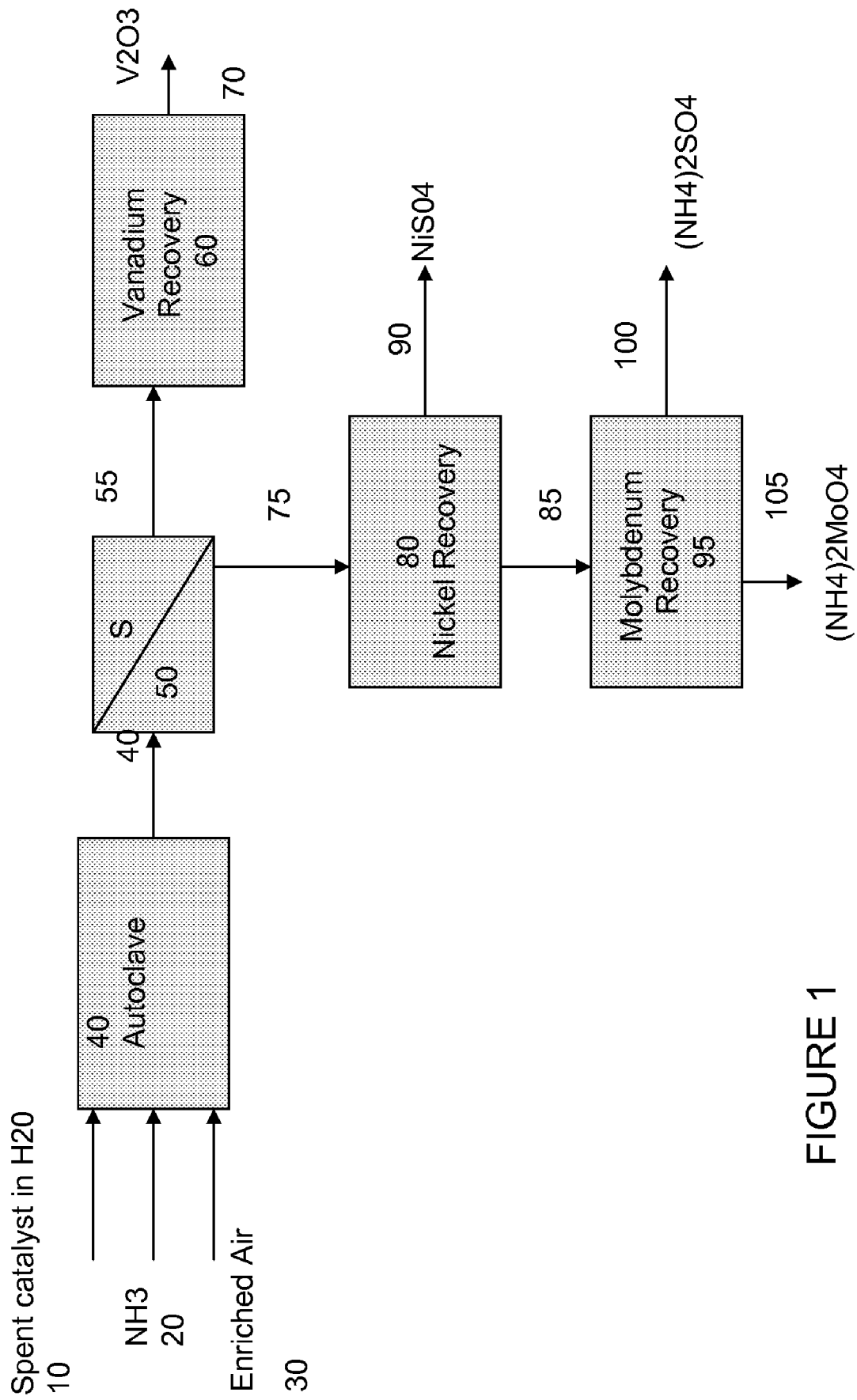
FIG. 1 provides a broad overview of the process of the invention.
Figure 2:
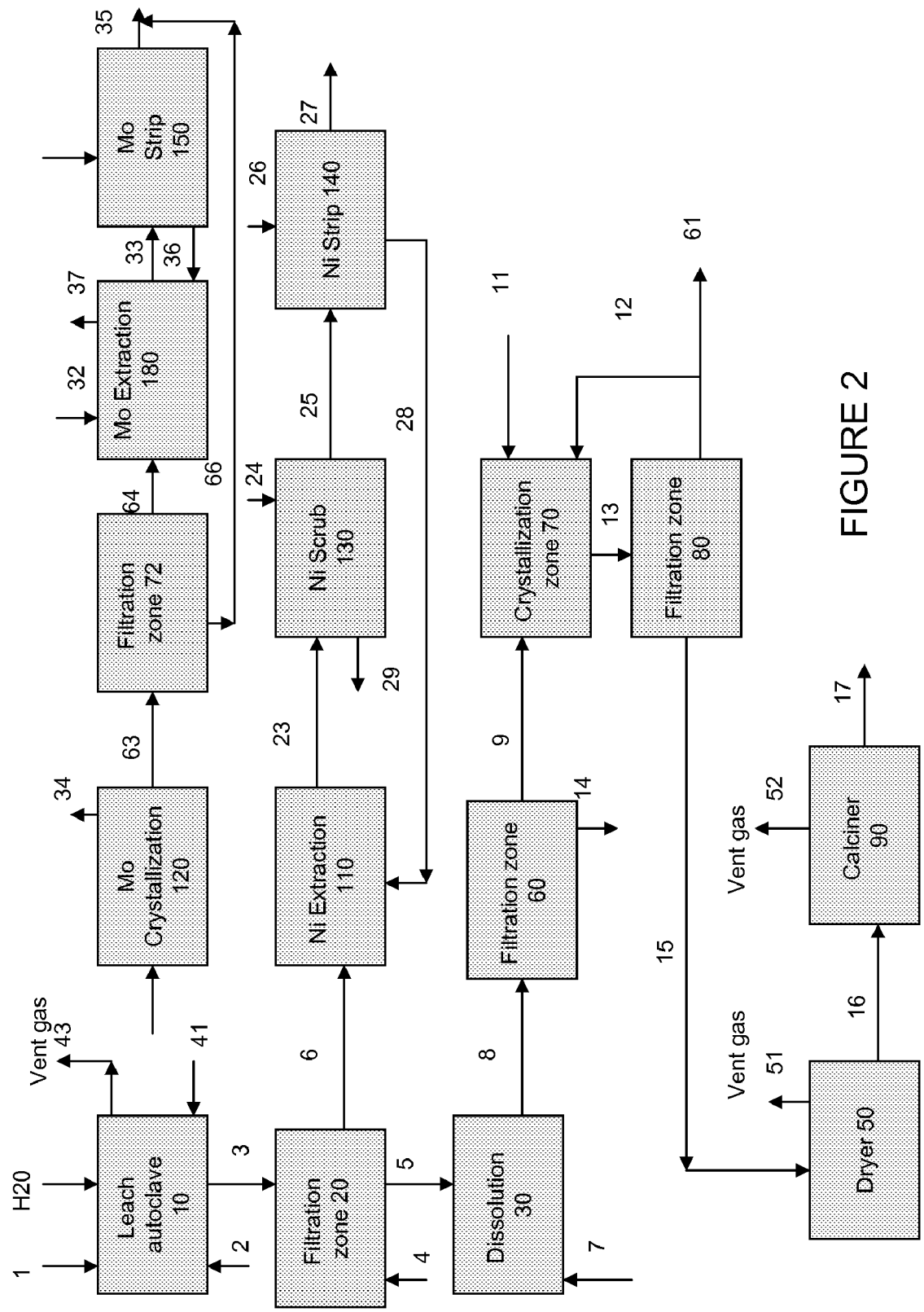
FIG. 2 describes the process in more detail.
Figure 3:
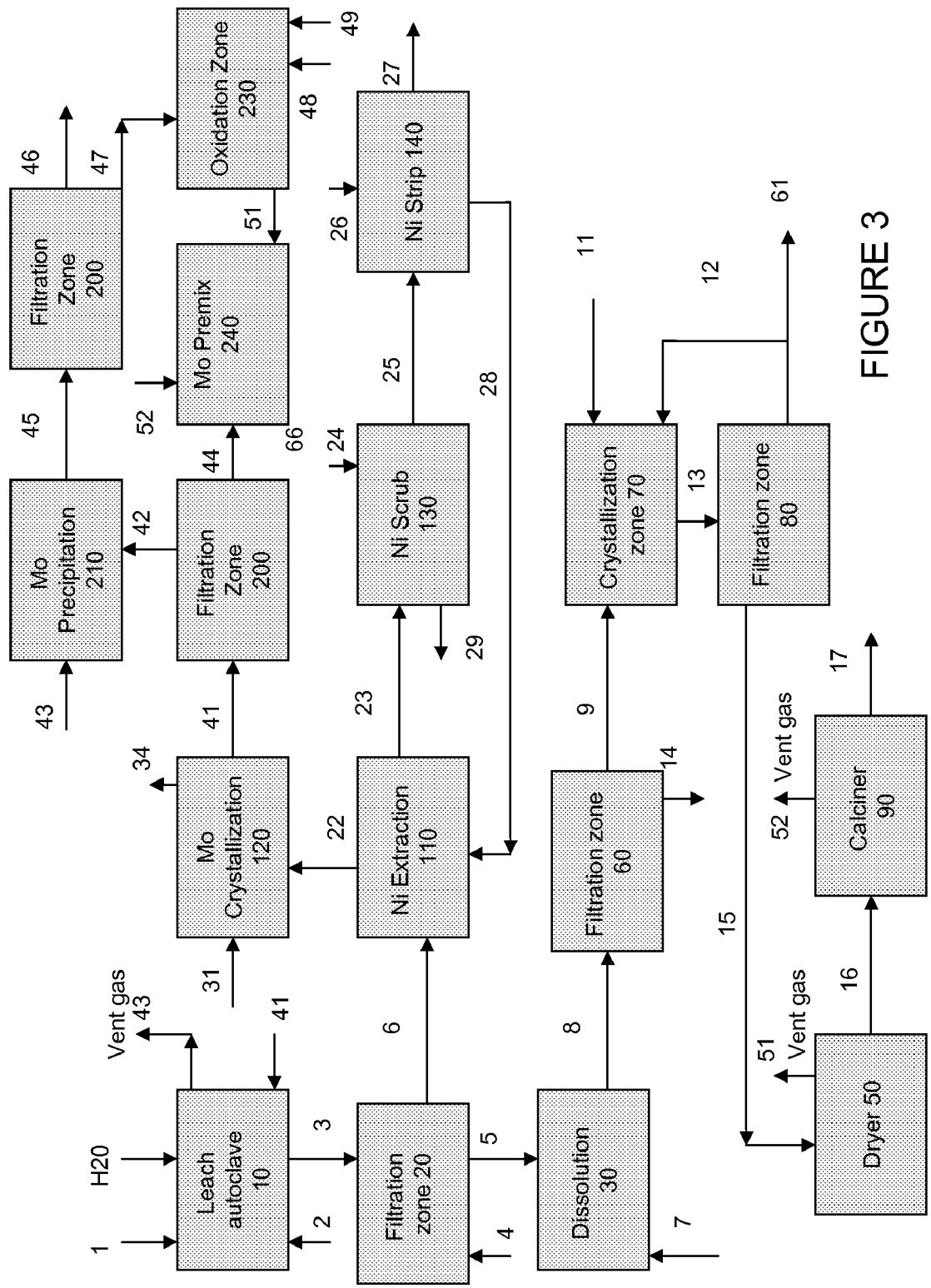
FIG. 3 further describes the process of FIG. 2, with more detail concerning molybdenum recovery.

A novel process has been envisioned that will enable the recovery of metals, specifically molybdenum, nickel, and deposited vanadium, from unsupported spent hydroprocessing catalysts. The claimed process comprises the steps of autoclave-based ammoniacal metals leach, vanadium metal recovery, nickel metal solvent extraction, and molybdenum metal solvent extraction. FIG. 1 provides a broad overview of the process. FIGS. 2 and 3, discussed below, are more specific.

FIG. 1, a brief overview of the process of the instant invention, shows spent catalyst, $MOS_2$ slurried in water (line 10), entering the autoclave 40, along with ammonia (line 20) and enriched air containing additional oxygen (line 30). Leaching reactions occur in the autoclave 40, producing ammonium molybdate and nickel ammonium sulfate, which remain in solution and pass, through line 45, to the leach residue filter press 50. The ammonium metavanadate precipitates out as a solid in the leach slurry. Solid/liquid separation occurs in the leach residue filter press 50. Solids pass through line 55 to vanadium recovery 60, which encompasses several steps, including calcining. Ultimately $V_2O_5$, is recovered, which passes through line 70 to preparation for sales.

Liquid solution containing ammonium molybdate and nickel ammonium sulfate passes through line 75 to nickel recovery 80, where nickel sulfate is removed in line 90. The liquid containing ammonium molybdate is passed through line 85 to molybdenum recovery 95. Ammonium molybdate is recovered in line 100 in purified form through the use of organic extraction techniques. Aqueous materials pass to wastewater in line 105. Both nickel and molybdenum are removed in the instant invention using mixer/settler extraction techniques. Molybdenum compounds may alternately be removed by precipitation techniques, however.

Catalyst Treatment Prior to Metals Extraction

Spent unsupported catalyst is recovered from an upstream hydroprocessing unit and is washed or deoiled to remove hydrocarbon feed and product oils. This process is not shown in the Figures. One means of deoiling is solvent deoiling, which removes the petroleum hydrocarbons without removing the coke. Deep deoiling of greater than 98% is accomplished by deoiling the spent oiled catalyst in the presence of an organic solvent such as toluene, xylene, or kerosene. (Other solvents can be used) Since the catalyst may become very reactive when deoiled, it is preferred to deoil under an inert atmosphere such as nitrogen. Deoiling may be expedited by increasing temperature, but this increases the cost as use of a pressure vessel becomes necessary. Therefore, deoiling becomes a time versus cost consideration, with a desirable deoiling time of less than 12 hours. Following deoiling, the solvent is stripped and separated from the hydrocarbon oil and recycled. The recovered oil is recycled to the upstream hydroprocessing unit.

Refer to FIG. 2.

The deoiled spent unsupported catalyst is then slurried with water. A continuous stream of slurried spent catalyst is pumped (line 1) to an ammoniacal pressure leaching autoclave 10. This autoclave is a multi-chambered, agitated vessel, in which both ammonia (line 2) and oxygen (line 41) are supplied to induce leaching reactions. These reactions may occur at various temperatures, preferably in the range from about 20° C. through about 315° C., more preferably in the range from about 35° C. through about 250° C., and most preferably in the range from about 90° C. through about 200° C. Autoclave vessel pressure ranges are preferably in the range from about 0 psig through about 1200 psig, more preferably in the range from about 100 psig through about 900 psig, and most preferably in the range from about 300 psig through about 700 psig, sufficient to suppress flashing in the vessel. Process pH values range from about 7 through about 12, more preferably from about 8 through about 11, and most preferably from about 9 through about 10. Leaching reactions occur as specified in the equations below.

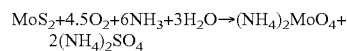

$MoS_2 + 4.5O_2 + 6NH_3 + 3H_2O \rightarrow (NH_4)_2MoO_4 + 2(NH_4)_2SO_4$

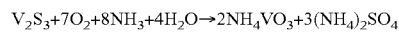

$V_2S_3 + 7O_2 + 8NH_3 + 4H_2O \rightarrow 2NH_4VO_3 + 3(NH_4)_2SO_4$

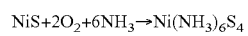

$NiS + 2O_2 + 6NH_3 \rightarrow Ni(NH_3)_6S_4$

Vanadium Extraction. Refer to FIG. 2. The ammonium molybdate and the nickel ammonium sulfate remain in solution and the ammonium metavanadate precipitates out as a solid in the leach slurry. The leached slurry is pumped from the autoclave 10 and routed to the autoclave discharge tank (not shown). Vent gas exits the autoclave in line 43. The slurry is cooled and pumped (line 3) to the leach residue filter press (filtration zone 20) where the liquor is separated from the solids. Additional water is added to the filtration zone 20 in line 4. The solid filter cake containing the impure ammonium metavanadate precipitate is passed (line 5) to a vanadium dissolution tank 30. Additional ammonia and water is fed to the dissolution tank (line 7) for pH adjustment to solubilize the ammonium metavanadate. The dissolution tank temperature is preferably in the range from about 0° C. through about 90° C., more preferably in the range from about 5° C. through about 65° C., and most preferably in the range from about 25° C. through about 45° C. Process pH values are preferably in the range from 2 through 7, more preferably from 3 through 7, and most preferably from 4 through 6.

The slurry solution (line 8) is pumped to a residue filter press (Filter zone 60) to remove the coke contaminates that form a solid filter cake which is conveyed and sent offsite (line 14) for disposal or blending with petroleum coke for fuel. The filter press filtrate (line 9) is pumped to an acidification vessel (part of crystallization zone 70) where sulfuric acid (line 11) is mixed with the filtrate until the desired pH is achieved. The desired pH is preferably in the range from about pH 6 through 10, more preferably from about 6 through 9, and most preferably from about 6 through 8. The pH-adjusted filtrate is routed to one of three vanadium crystallizer vessels operating in batch (also part of crystallization zone 70) where purified ammonium metavanadate crystallizes as a solid. The vanadium crystallizer temperature is preferably in the range from about 10° C. through about 40° C., more preferably in the range from about 15° C. through about 35° C., and most preferably in the range from 20° C. through 30° C.

The crystallizer effluent proceeds (line 13) to a filter press (Filtration zone 80), where nominally pure ammonium metavanadate is recovered as a solid. The filtrate (liquor), containing from about 10% to 20% of the remaining ammonium metavanadate is recycled back to the vanadium crystallizer (line 12) along with the ammonium sulfate salts to recover more ammonium metavanadate. Any filtrate not recycled is removed via line 61.

From the filter press (Filtration zone 80), the ammonium metavanadate solid is conveyed through line 15 to the vanadate dryer 50 where it is dried in warm air. Vent gas is removed in line 51. The dried metavanadate is then sent (via line 16) to the vanadate calciner 90. Vent gas is removed from the calciner in line 52. In the calciner 90, the ammonium metavanadate is heated to the point at which the decomposition reactions specified below take place.

$$2NH_4VO_3 \rightarrow V_2O_5 + 2NH_3 + H_2O$$

The vent gas (lines 51 and 52) from the dryer and calciner is routed to an ammonia recovery unit for cleanup, while the vanadium pentoxide product (line 17) is flaked for sales.

Nickel extraction Refer to FIG. 2. The liquor from the ammoniacal leach containing the metal values of molybdenum and nickel is routed (via line 6) to the first stage of the mixer-settler solvent extraction loop (Ni extraction 110). Optionally, the liquor can be pretreated for further organic carbon removal by use of a sacrificial solvent, preferably a kerosene diluent, before being routed to the first stage of the mixer-settler solvent extraction loop (Ni extraction 110). The mixer settlers function by combining the aqueous and organic solutions via impellers to achieve a well-mixed liquid. The liquid mixture passes over a weir and separates into aqueous and organic phases. Each mixer-settler acts as an extraction (Ni extraction 110), scrubbing (Ni scrubbing 130) or stripping stage (Ni stripper 140). Multiple stages are typically needed to affect the desired result. The liquid mixture passes from Ni extraction to Ni scrubbing via line 23 and from Ni scrubbing to Ni stripping via line 25.

The Ni solvent extraction loop temperature is in the range from about 20° C. through about 50° C., preferably from about 30° C. through about 45° C., and most preferably from about 35° C. through about 40° C. The desired pH is preferably in the range from about 7 through about 12, more preferably from about 7.5 through about 11, and most preferably from about 8.5 through about 10.

In the Ni extraction zone 110, the liquor is contacted countercurrently with lean organic solution (line 28) comprising an oxime and kerosene. The oxime is preferably a ketoxime such as 2-hydroxy-5-nonylacetophenone oxime. The ketoxime solution is frequently known commercially as LIX-84-I. Alternately, hydroxyoximes, such as those disclosed in U.S. Pat. No. 4,432,949 and incorporated by reference may be used. Oximes are disclosed in general in U.S. Pat. No. 4,514,369. The lean solution absorbs the nickel into the organic phase, while the molybdenum stays in the aqueous phase. The molybdenum-containing liquor is pumped to intermediate tankage (line 22) before being processed for Mo recovery (Mo crystallization zone 120).

The effluent from Ni extraction zone 110 enters the scrubbing zone 130, where it is contacted countercurrently with a concentrated (10%) sulfuric acid solution (line 24). The effluent from the scrubbing zone 130 enters the Ni stripping zone 140 (via line 25) and is once again contacted countercurrently with a concentrated (10%) sulfuric acid solution (line 26). In both zones 130 and 140, sulfuric acid acts to both regenerate the organic solvent and transfer the nickel to the aqueous phase. Mixing and settling occur in both the Ni scrubber 130 and the Ni stripper 140. Spent sulfuric acid is shown exiting the Ni scrubber as line 29. The regenerated, lean organic solvent (line 28) is recovered and sent to intermediate tankage before being recycled to the extraction mixer-settlers (Ni extraction 110). Any needed make-up solution is added at this point. The aqueous phase containing the nickel sulfate solution is the desired recovered nickel product (line 27). Nickel sulfate refining processes well known in the art may be further employed to reduce the nickel to other desired states.

Molybdenum removal Refer to FIG. 2 initially. FIG. 2 illustrates Mo removal by extraction techniques.

The aqueous molybdenum containing liquor (line 22) can optionally be pretreated (part of Mo crystallization 120 and not shown) to remove arsenic and phosphorus (line 34) by adjusting the pH to 8.5 and contracting the aqueous liquor with $MgSO_4$ (line 31) to precipitate the arsenic as magnesium ammonia arsenic oxide and the phosphorus as magnesium ammonia phosphate. The pretreatment approach would probably be used during recycle of high volumes of the spent catalyst.

The liquor containing aqueous molybdenum (line 22) is pumped to an acidification vessel (part of Mo crystallization zone 120 and not shown separately) where sulfuric acid is mixed with the aqueous molybdenum containing liquor until the desired pH is achieved. The desired pH preferably ranges from about pH 2 to about 7, more preferably from about pH 2.5 to about 6, and most preferably from about pH 3 to about 5. The pH-adjusted liquor is routed to one of three molybdenum crystallizer vessels operating in batch (part of Mo crystallization 120) where purified ammonium molybdate crystallizes as a solid. The molybdenum crystallizer temperature preferably ranges from about 10° C. to about 40° C., more preferably ranges from about 15° C. to about 35° C., and most preferably ranges from 20° C. to about 30° C.

The molybdenum-containing liquor from the Mo crystallizer is fed (via line 63) to a filtration zone 72, from which an ammonium molybdate aqueous solution is removed via line 66. The ammonium molybdate solution in line 66 joins line 35. The solvent, which still contains molybdenum, passes after filtration (via line 64) to the first stage of the molybdenum mixer-settler solvent extraction loop (Mo extraction 160), where it is contacted countercurrently with lean solution of a water soluble, saturated, straight chain amine solvent mixed with Isodecanol (line 36) and kerosene (line 32). The straight chain amine solvent is preferably the commercial preparation Alamine® 336. The straight chain alkyl groups of the solvent are a mixture of $C_8$ and $C_{10}$ amines, with the $C_8$ carbon chain predominating 2:1. Molybdenum is extracted into the organic phase, while any non-absorbed components stay in the aqueous phase. The aqueous raffinate from the extraction section is sent offsite to waste water treatment facilities (line 37).

The Mo solvent extraction loop temperature ranges preferably from about 20° C. to about 50° C., more preferably from about 30° C. to about 45° C., and most preferably from about 35° C. to about 40° C. The desired pH preferably ranges from about pH 7 to 12, more preferably from pH 7.5 to 11, and most preferably from pH 8.5 to 10.

The organic solution containing Alamine 336 solvent and molybdenum is routed (line 33) to the first stage of the stripping mixer settlers 150. The organic solution is contacted countercurrently with a concentrated ammonia solution (line 38), effectively stripping the molybdenum into a pure and concentrated ammonium molybdate aqueous solution (line 35). The stripped organic is recycled back to the first stage extraction (line 36) where it is regenerated by the acidified molybdenum feed (line 64). The stripped solution containing the ammonium molybdate (line 35 in combination with line 66) is the desired recovered molybdenum product.

FIG. 3 differs from FIG. 2 only in that it illustrates molybdenum removal by precipitation with $H_2S$ rather than by solvent extraction. The liquor containing aqueous molybdenum is routed (via line 22) to Mo crystallization step 120. There the liquor may be pretreated with $MgSO_4$ (line 31) as discussed in FIG. 2 to precipitate out arsenic as magnesium ammonia arsenic oxide and phosphorus as magnesium ammonia phosphate. These precipitates are removed via line 34.

The molybdenum-containing liquor from the Mo crystallizer is fed (via line 41) to a filtration zone 200, from which an aqueous solution comprising ammonium molybdate is removed via line 42. The solution is contacted in Mo precipitation zone 210 with $H_2S$ (line 43), resulting in a precipitate of molysulfides. The solution, containing the precipitate, passes through line 45 to Filtration Zone 220. The molysulfides are removed via line 46 as a solid. The remaining solution, which still contains molybdenum passes, via line 47, to oxidation zone 230. There the solution is contacted with oxygen (line 48) and ammonia (line 49). The solution then passes, via line 51 to the molybdenum remix stage 240, where the solution is contacted with ammonia and water from line 52, as well with the filtrate from line 44. The ammonium molybdate product is removed via line 62. Precipitation techniques are further discussed in U.S. Pat. Nos. 3,357,821 and 3,455,677, which are incorporated herein by reference.

What is claimed:

1. A method for recovering vanadium, nickel and molybdenum from a spent unsupported catalyst that has been used in a hydroprocessing process, said method comprising the steps of:
    a) treating said spent unsupported catalyst with an aqueous solvent and an oxidizer in a leaching zone at leaching conditions;
    b) passing the effluent of step (a), which comprises liquid and solid material to a filtration zone, from which solid material is recovered as a filter cake and a liquid material is generated;
    c) passing the filter cake of step (b), which comprises ammonium metavanadate to a dissolution zone, to which ammonia is added under dissolution conditions:
    d) passing the effluent of step (c) to a first filtration zone for removal of coke contaminants;
    e) passing the effluent of step (d) to a crystallization zone, wherein the effluent is adjusted for pH and ammonium metavanadate crystallizes as a solid;
    f) passing the effluent of step (e) to a second filtration zone for the removal of ammonium metavanadate solid;
    g) passing the liquid material of step (b), which comprises an aqueous phase and an organic phase, to a mixer-settler zone;
    h) separating the aqueous phase of step (g), which comprises molybdenum, from the organic phase, which comprises nickel;
    i) subjecting the organic phase of step (h), which remains in the mixer-settler zone, to at least one cycle of extraction, scrubbing and stripping prior to the removal of nickel sulfate solution as product;
    j) removing molybdenum compounds from the aqueous phase of step (h) by solvent extraction or precipitation.

2. The method of claim 1, wherein the unsupported catalyst is washed or deoiled to remove hydrocarbon feed and product oils prior to the step of treating said catalyst with an aqueous solvent.

3. The process of claim 2, wherein the catalyst is deoiled using an organic solvent in an inert atmosphere.

4. The process of claim 3, wherein the organic solvent is selected from the group consisting of toluene, xylene and kerosene.

5. The process of claim 1, wherein the leaching zone is an autoclave, the aqueous solvent comprises ammonia, and the oxidizer comprises oxygen.

6. The process of claim 1, wherein leaching reactions occur at a temperature in the range between 20° C. and 315° C., a pressure in the range between 0 psig and 1200 psig, and a pH in the range from 7 to 12.

7. The process of claim 1, wherein the liquid material of step (b) is treated with a kerosene diluent for organic carbon removal prior to step (h).

8. The process of claim 1, wherein conditions of step (i) comprise a temperature in the range from about 20° C. through about 50° C., and a pH in the range from 7 through 12.

9. The process of claim 1, wherein the liquid material of step (b) is contacted with a lean organic solution which comprises oxime and kerosene.

10. The process of claim 9, wherein the oxime is a ketoxime.

11. The process of claim 10, wherein the ketoxime is 2-hydroxy-5-nonylacetophenone oxime.

12. The process of claim 1, wherein the liquid material of step (b) is contacted with a lean organic solution.

13. The process of claim 12, wherein the liquid material of step (b) is contacted countercurrently with a lean organic solution.

14. The process of claim 1, wherein the organic phase of step (h) is contacted currently during scrubbing and stripping in the mixer-settler zone with sulphuric acid.

15. The process of claim 1, wherein the aqueous phase of step (h) is pretreated by adjustment to a basic pH, followed by contact with magnesium sulfate in order to remove magnesium and phosphorus, prior to solvent extraction of molybdenum.

16. The process of claim 14, in which arsenic is removed as magnesium ammonia arsenic oxide and phosphorus is removed as magnesium ammonia phosphate.

17. The process of claim 1, in which the removal of molybdenum from the aqueous phase by solvent extraction further comprises:
    mixing the aqueous phase with sulfuric acid in order to obtain a pH in the range from about 2 to about 7;
    crystallizing ammonium molybdate solid from the aqueous phase and separating it from the remaining liquid;
    contacting the remaining liquid countercurrently with a lean solution of a water soluble, saturated, straight chain amine solvent in admixture with isodecanol and kerosene, thereby creating an aqueous phase and an organic phase, the molybdenum being extracted into the organic phase;
    separating the aqueous and organic phases;
    contacting the organic solution countercurrently with a concentrated ammonia solution in at least one mixer settler zone; and
    recovering ammonium molybdate as product.

18. The process of claim 17, where the straight chain alkyl groups of the solvent are a mixture of $C_8$ and $C_{10}$ amines, with the $C_8$ carbon chain predominating 2:1.

19. The process of claim 1, in which the removal of molybdenum from the aqueous phase by precipitation further comprises:
    i) passing the aqueous phase to a crystallization zone for the removal of one or more contaminants by precipitation;

ii) passing the effluent of step (a) to a filtration zone, where an aqueous solution comprising ammonium molybdate is recovered, as well as a filtrate;

iii) contacting the aqueous solution comprising ammonium molybdate with $H_2S$ in a molybdenum precipitation zone, there by obtaining a precipitate comprising molybdenum disulfide and a liquid supernatant;

iv) passing the precipitate comprising molybdenum disulfide and the supernatant to a filtration zone, generating a supernatant and a precipitate which is removed as a solid;

v) passing the supernatant of step (iv) to an oxidation zone, where it is contacted with oxygen and ammonia;

vi) passing the effluent of step (v) to a molybdenum remix zone, where it is combined with the filtrate of step (ii), the mixture being contacted with ammonia and water to produce a product comprising ammonium molybdate.

20. The process of claim 19, wherein the contaminants are selected from the group consisting of arsenic and phosphorus and the ammonium molybdate product comprises octomolybdates.

* * * * *